A. J. HERSCHMANN.
FLUID CONTAINER.
APPLICATION FILED APR. 24, 1920.
1,351,330.
Patented Aug. 31, 1920.
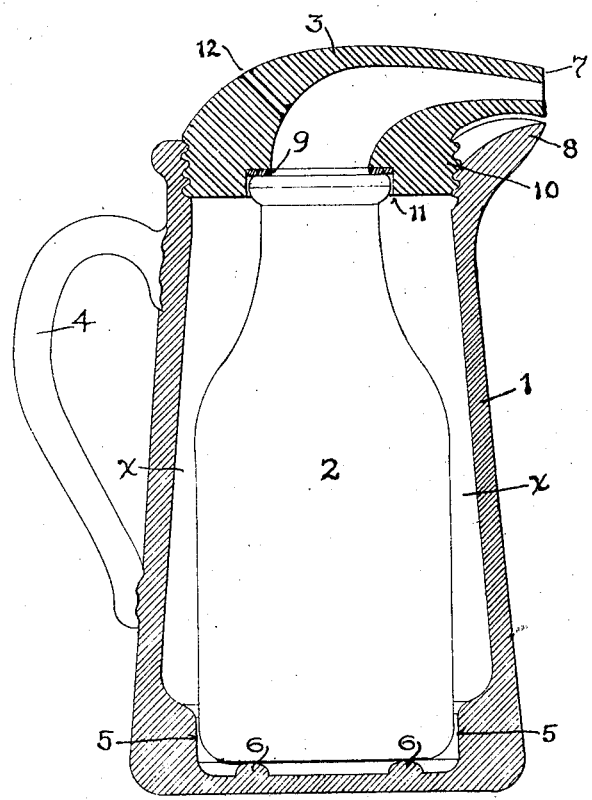
Inventor
ARTHUR J. HERSCHMANN
by *Edwin W. Hammer* Att'y.

UNITED STATES PATENT OFFICE.

ARTHUR J. HERSCHMANN, OF NEW YORK, N. Y.

FLUID-CONTAINER.

1,351,330.  Specification of Letters Patent.  Patented Aug. 31, 1920.

Application filed April 24, 1920. Serial No. 376,381.

*To all whom it may concern:*

Be it known that I, ARTHUR J. HERSCHMANN, a citizen of the United States, and a resident of the city of New York, in the county of New York and State of New York, have invented certain new and useful Improvements in Fluid-Containers, of which the following is a specification, reference being had to the accompanying drawing, forming part thereof.

This invention relates to fluid containers, and particularly to fluid containers designed to receive and hold a separate bottle or other fluid receptacle; the particular embodiment of the invention described herein has to do with a fluid container or pitcher within which may be placed and securely held a milk or cream bottle of standard shape and size, so as to permit such bottle to be safely handled and the fluid poured therefrom, without such bottle being exposed to view.

It will be understood that such milk bottles are crude and would not present an attractive appearance upon the table, whereas such a bottle, or a succession of such bottles, might readily be placed within the container I provide with ease and convenience and with an approach to a more agreeable appearance.

In the accompanying drawing, I have shown an embodiment of my invention, showing a side view in section of my fluid container with a milk or cream bottle in place within it.

In this drawing, my fluid container is shown as a pitcher 1 with a threaded neck or upper portion 10 of such a size as to permit the bottle 2 to be inserted therethrough. This pitcher has a handle 4 of convenient form and position and the bottom has one or more buttons 6, integral or otherwise, upon which the bottom of the bottle may rest.

Above the bottle and assisting in holding such bottle in place is a cap 3 adapted to coöperate with the neck 10 of the pitcher 1; this cap has the additional functions of serving as a cover to the milk bottle and of providing a conduit 7 through which the contents of the bottle may be poured. The cap is of porcelain or the like and the conduit 7 is formed within the solid mass thereof; the conduit is so shaped that the insertion of the cap within the neck of the pitcher causes the inner end of the conduit to register with the mouth of the bottle. A washer 9 of rubber or other appropriate material may be interposed between the cap and the bottle 2 to form a fluid-tight connection. I prefer to so form the neck 11 of the cap 3 that it will extend down over the sides of the top of the bottle 2 so as to position the bottle and hold it securely; as a further aid in retaining the bottle in its preferred position, I so shape the bottom of the pitcher, as at 5, as to form a recess within which the bottom of the bottle may fit. The cap 3 may have a venthole 12.

I also prefer to provide the body portion of the pitcher or fluid container with a spout 8 which will open at a point above the bottom of the threaded portion of the cap but which will facilitate the pouring of fluid from the pitcher should such container be used without the cap and without a bottle within it. It will be understood that cracked ice may possibly be utilized in the space $x$ between the milk bottle 2 and the walls 1 of the body portion of the structure. In other words, I provide a container which may perform all the functions of an ordinary pitcher, but which has the additional and novel function of receiving a milk bottle or the like and holding such bottle firmly in place while protecting its contents from dust, though permitting such contents to be readily poured out.

I do not wish to limit myself to the precise configuration and arrangement of parts shown in my above described preferred embodiment of my invention, as numerous modifications may be made which will still be within such invention and the appended claims.

What I claim and wish to protect by Letters Patent of the United States is as follows:

1. A fluid container, comprising a body portion adapted to receive a milk bottle or the like and having a neck of sufficient size to permit the insertion of the bottle within the container, in combination with a cap detachably secured to the neck of the body portion and having a conduit formed within the solid mass thereof, such conduit registering with the mouth of the bottle and serving as a spout through which the contents of the bottle may be poured.

2. A fluid container comprising a body portion adapted to receive a milk bottle or the like and having a threaded neck through which such bottle may be inserted, such body portion having a spout and a coöperating unitary threaded cap with an opening formed within it and registering with the mouth of the bottle through which the contents of the bottle may be poured.

3. A fluid container comprising a body portion adapted to receive a milk bottle or the like and having a neck of sufficient size to permit the insertion of the bottle within the container and also having a recessed section at the bottom within which the bottom of the bottle may fit, together with a coöperating unitary covered cap detachably secured to the neck of the body portion and having an opening formed within it and registering with the mouth of the bottle through which the contents of the bottle may be poured.

4. A fluid container comprising a body portion adapted to receive a milk bottle or the like and having a neck of sufficient size to permit the insertion of the bottle within the container and also having a recessed section at the bottom within which the bottom of the bottle may fit, together with a coöperating unitary covered cap detachably secured to the neck of the body portion and having an opening formed within it and registering with the mouth of the bottle through which the contents may be poured, such cap being provided with a recess within which the mouth of the bottle may fit.

5. A fluid container comprising a body portion adapted to receive a milk bottle or the like and having a threaded neck of such size as to permit the insertion of such bottle therethrough and also having a spout leading from a portion of the neck above the lower portion of the threaded section, together with a unitary covered cap with threads adapted to coöperate with the threads of the neck, such cap having an opening formed within it and registering with the mouth of the bottle through which the contents of the bottle may be poured.

6. A fluid container comprising a body portion adapted to receive and inclose a milk bottle or the like, an opening therein through which the bottle may be inserted and a cover portion forming an abutment for the top of the bottle and having a conduit formed within the solid mass thereof which registers with the mouth of the bottle and serves as a spout through which the contents of the bottle may be poured.

ARTHUR J. HERSCHMANN.